United States Patent
Diab

(10) Patent No.: US 8,395,992 B2
(45) Date of Patent: Mar. 12, 2013

(54) METHOD AND SYSTEM FOR NEGOTIATING MULTIPLE DATA RATE TRANSITIONS ON AN ETHERNET LINK

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 98 days.

(21) Appl. No.: 12/235,391

(22) Filed: Sep. 22, 2008

(65) Prior Publication Data
US 2009/0154491 A1    Jun. 18, 2009

Related U.S. Application Data

(60) Provisional application No. 61/014,215, filed on Dec. 17, 2007, provisional application No. 61/094,632, filed on Sep. 5, 2008.

(51) Int. Cl.
*H04L 12/26* (2006.01)
(52) U.S. Cl. .......................... 370/232; 709/233
(58) Field of Classification Search ................ None
See application file for complete search history.

(56) References Cited

U.S. PATENT DOCUMENTS

| | | | |
|---|---|---|---|
| 6,266,348 B1 * | 7/2001 | Gross et al. | 370/493 |
| 6,587,476 B1 * | 7/2003 | Lewin et al. | 370/467 |
| 6,795,450 B1 | 9/2004 | Mills et al. | |
| 7,136,412 B1 * | 11/2006 | Gavish et al. | 375/222 |
| 7,643,512 B2 * | 1/2010 | Gorsetman et al. | 370/468 |
| 2004/0213170 A1 * | 10/2004 | Bremer | 370/282 |
| 2006/0034295 A1 | 2/2006 | Cherukuri et al. | |
| 2007/0280239 A1 | 12/2007 | Lund | |
| 2009/0125735 A1 | 5/2009 | Zimmerman | |

\* cited by examiner

*Primary Examiner* — Kwang B Yao
*Assistant Examiner* — Alex Skripnikov
(74) *Attorney, Agent, or Firm* — Duane S. Kobayashi

(57) ABSTRACT

An Ethernet network may comprise multi-rate link partners coupled via an Ethernet link wherein a pattern, over time, of offered data rates may be determined. Link partners may establish a communication policy for modifying transmission rates to mimic offered data rates and may vary rates accordingly. The communication control policy may be communicated between nodes via one or more of physical layer control characters, an out of band channel and higher layer protocol packets. An established communication policy may improve energy efficiency and may be dynamically modified, for example, based on link utilization. In this regard, data rates may be symmetrical or asymmetrical with respect to direction of transmission. Moreover, data rates may comprise the offered data rate plus additional bandwidth for head room and may comprise one or more of a full rate, an intermediate rate and/or a rate of zero. Rate transitions may be synchronized among network nodes.

60 Claims, 4 Drawing Sheets

Changing link rate

METHOD AND SYSTEM FOR NEGOTIATING MULTIPLE DATA RATE TRANSITIONS ON AN ETHERNET LINK

CROSS-REFERENCE TO RELATED APPLICATIONS/INCORPORATION BY REFERENCE

This application makes reference to and claims priority to U.S. Provisional Application Ser. No. 61/014,215 filed on Dec. 17, 2007, entitled "method and system for negotiating multiple data rate transitions on an Ethernet link," which is hereby incorporated herein by reference in its entirety.

This application makes reference to and claims priority to U.S. Provisional Application Ser. No. 61/094,632 filed on Sep. 5, 2008, entitled "method and system for negotiating multiple data rate transitions on an Ethernet link," which is hereby incorporated herein by reference in its entirety.

This patent application also makes reference to:
U.S. patent application Ser. No. 12/235,345 which was filed on even date herewith;
U.S. patent application Ser. No. 12/235,368 which was filed on even date herewith;
U.S. patent application Ser. No. 12/235,410 which was filed on even date herewith; and
U.S. patent application Ser. No. 12/235,506 which was filed on even date herewith.

Each of the above stated applications is hereby incorporated herein by reference in its entirety.

FIELD OF THE INVENTION

Certain embodiments of the invention relate to communicating. More specifically, certain embodiments of the invention relate to a method and system for negotiating multiple data rate transitions on an Ethernet link.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a method and system for negotiating multiple data rate transitions on an Ethernet link, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in method and system for negotiating multiple data rate transitions on an Ethernet link. In accordance with various embodiments of the invention, an Ethernet network may comprise multi-rate link partners that may be coupled via an Ethernet link. The multi-rate link partners may be enabled to determine a repeated pattern, over time, of changing offered data rates. Based on the determination, the multi-rate link partners may negotiate a plan or communication policy for modifying link transmission rates over time and may transmit and or receive data accordingly. In this manner, the link transmission rates may mimic the pattern, over time, of changing offered data rates according to the communication policy. In instances where the communication policy is established and the pattern of varying link transmission rates are known in advance, the multi-rate link partners may forego various time consuming steps for tearing down and/or setting up a connection between different link rates. The communication control policy may be communicated between nodes via one or more of physical layer control characters, physical layer out of band channel and packet generated from protocols above the physical layer. In addition, link transmission rates for data transmitted from a first node to a second node may be symmetrical or asymmetrical with respect to link transmission rates for data transmitted from the second node to the first node. In various embodiments of the invention, link transmission rates may comprise the offered data rate plus additional bandwidth for head room, for example, head room for out of band signaling. The link transmission rates, which may be modified over time, may comprise one or more of a full rate, an intermediate rate and/or a rate of zero and transitions between link rates may be synchronized among nodes. In various embodiments of the invention, an established communication policy may be dynamically modified, for example, based on link utilization. In this manner, operation of Ethernet link partners may be more energy efficient.

Figure 1:
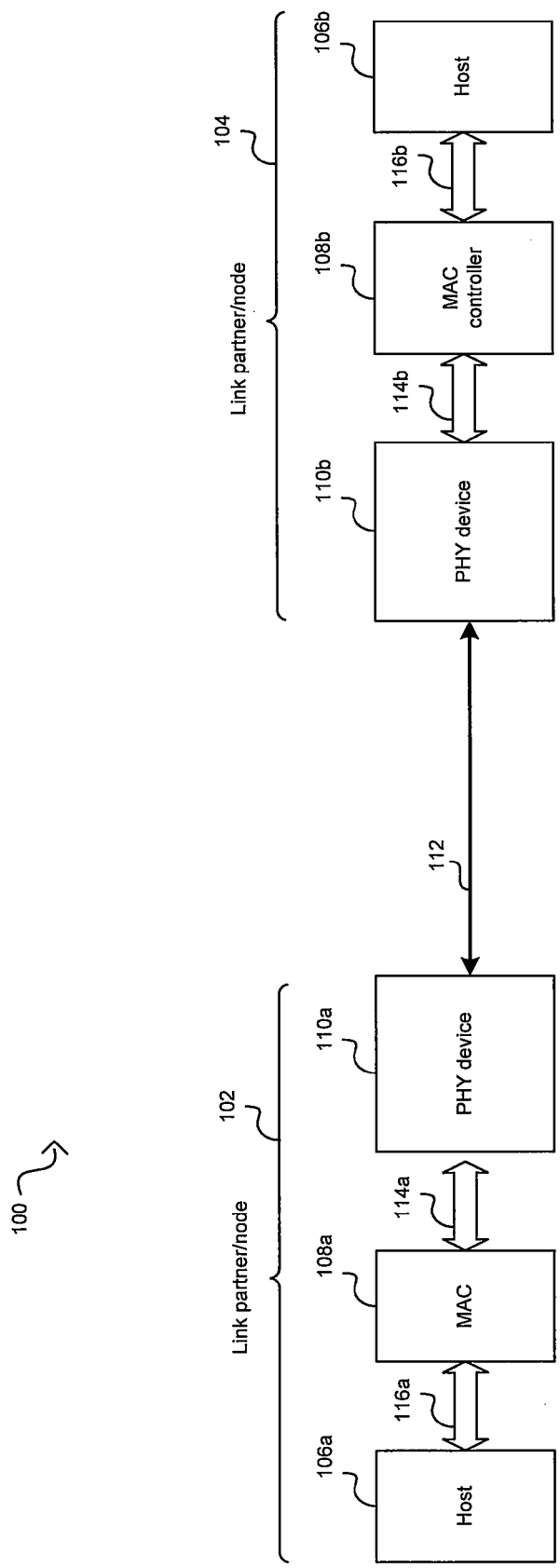
FIG. 1 is a block diagram illustrating an exemplary Ethernet connection enabled to manage multiple data rate transitions, in accordance with an embodiment of the invention.

FIG. 1 is a block diagram illustrating an exemplary Ethernet connection enabled for negotiating multiple data rate transitions on an Ethernet link, in accordance with an embodiment of the invention. Referring to FIG. 1, there is shown a system 100 that comprises a node 102 and a node 104. The node 102 and the node 104 may communicate via a cable 112. In an exemplary embodiment of the invention, the cable 112 may comprise up to four or more physical channels, each of which may, for example, comprise an unshielded twisted pair (UTP). The node 102 and the node 104 may communicate via two or more physical channels in the cable 112. For example, Ethernet over twisted pair standards 10 BASE-T and 100 BASE-TX may utilize two pairs of UTP while Ethernet over twisted pair standards 1000 BASE-T and 10 GBASE-T may utilize four pairs of UTP.

In an exemplary embodiment of the invention, the link partners, node 102 and node 104, may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In an exemplary embodiment of the invention, the link partners, node 102 and/or node 104, may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In an exemplary embodiment of the invention, the link partners, node 102 and/or node 104, may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The node 102 may comprise a host 106a, a medium access control (MAC) controller 108a, and a PHY device 104a. The node 104 may comprise a host 106b, a MAC controller 108b, and a PHY device 110b. Notwithstanding, the invention is not limited in this regard. In various embodiments of the invention, the node 102 and/or node 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the node 102 and node 104 may be enabled to utilize AudioNideo Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the node 102 and the node 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the node 102 and the node 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable communication of data between node 102 and node 104 at symmetric data rates. For example, transmission and reception of data may occur at the same rate in both directions between the link partners node 102 and node 104B. In other exemplary embodiments of the invention, data may be communicated at asymmetrical data rates. For example, data may be communicated at different rates for different directions, namely uplink and/or downlink directions. As such, a node may utilize a first data rate for transmission and a second data rate for reception. In this manner, an exemplary embodiment of the invention may comprise a multimedia server as node 102 and may comprise a multimedia client as node 104. The node 102 may transmit multimedia data, for example, to the node 104 at high(er) data rates while the node 104 may transmit control or auxiliary data associated with the multimedia content at low(er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. Exemplary MIIs may comprise gigabit MII (GMII), 10 Gigabit MII (XGMII), Serial Gigabit MII (SGMII), and Reduced Gigabit MII (RGMII).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, physical layer transceivers, PHY transceivers, PHY receivers or PHY transmitters, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112. Various exemplary embodiments of the invention may enable the PHY devices 110*a* and/or 110*b* to utilize a reserved and/or out of band channel on the link 112 to exchange information for managing state changes such as transitioning from a first data rate to a second data rate. For example, in various embodiments of the invention, communications on the link 112 may adhere to 10 GBASE-T standards wherein a reserved and/or out of band channel may comprise an auxiliary or reserved channel as described in clause 55 of the IEEE 802.3AN standard. In this regard one or more auxiliary or indication bits may be prepended to blocks of data within an Ethernet frame. The auxiliary bit may be utilized for communicating data rate transition information within the 10 GBASE-T network. Accordingly, a conventional 10 GBASE-T network may transmit 800 Msymbols per second on each physical channel. A data rate of the auxiliary channel may be calculated as shown in EQ. 1.

$$\frac{1 \text{ auxiliary bit}}{256 \text{ symbols}} \cdot \frac{800\text{M symbols}}{\text{sec}} = \frac{3.125\text{M } aux \text{ bits}}{\text{sec}} \quad \text{EQ. 1}$$

Thus, the 10 GBASE-T standard reserves an auxiliary channel of 3.125 Mbps. Accordingly, this auxiliary channel may be utilized for exchanging signals to manage data rate transition and/or state change information between Ethernet link node 102 and node 104. The auxiliary channel may be referred to as an out of band channel as well as a reserved channel. Accordingly, a reserved and/or out of band channel may be established during data rate transitions on the link. In this regard, when transitioning to a new data rate, the new data rate may comprise headroom for out of band signaling. Therefore, the new data rate may be higher than a rate necessary to support data traffic by an amount equal to or slightly greater then a rate needed to support the addition of reserved and/or out of band data.

Moreover, one or more control characters that may be generated by a sub-layer within the physical layer, for example, the physical coding sub-layer (PCS) in a 10 GBASE-T system, may be utilized to convey information for managing the data rate transitions. These control characters, also known as special symbols, may be transmitted during inter-packet gap (IPG) at packet boundaries or inserted within a packet.

Physical layer as well as packet layer signaling such as policy or management control information may be utilized for managing or requesting a plurality of state changes wherein state changes may be repeated in a pattern over time. For example, the state changes may comprise a transition from a first data rate to a second data rate, such as, from a zero rate to an intermediate or full rate, from an intermediate or full rate to a zero rate, from an intermediate rate to a higher or full rate and from a full or higher rate to an intermediated rate.

The MAC controller 108*a* may comprise suitable logic, circuitry, and/or code that may enable handling of data link layer, layer 2, operability and/or functionality in the local link partner 102. Similarly, the MAC controller 108*b* may comprise suitable logic, circuitry, and/or code that may enable handling of layer 2 operability and/or functionality in the remote link partner 104. The MAC controllers 108*a* and 108*b* may be configured to implement Ethernet protocols, such as those based on the IEEE 802.3 standard, for example. Notwithstanding, the invention is not limited in this regard.

The MAC controller 108*a* may communicate with the PHY device 110*a* via an interface 114*a* and with the host 106*a* via a bus controller interface 116*a*. The MAC controller 108*b* may communicate with the PHY device 110*b* via an interface 114*b* and with the host 106*b* via a bus controller interface 116*b*. The interfaces 114*a* and 114*b* correspond to Ethernet interfaces that comprise protocol and/or link management control signals. The interfaces 114*a* and 114*b* may be multirate capable interfaces and/or media independent interfaces (MII). The bus controller interfaces 116*a* and 116*b* may correspond to PCI or PCI-X interfaces. Notwithstanding, the invention is not limited in this regard.

In operation, PHY devices such as the PHY devices 110*a* and 110*b* may conventionally transmit data via a fixed number of physical channels at a fixed data rate which may result in network links being underutilized and transmitting IDLE symbols for significant portions of time. In this regard, when the link partners 102 and 104 first establish a connection, they may exchange some preliminary information and/or training signals. In this regard, the link partners 102 and 104 may negotiate a data rate (e.g., 10 Gbps) and simplex or duplex mode (e.g., full-duplex) for communicating with each other. Additionally, in order to establish reliable communications, each of the link partners 102 and 104 may need to adjust various parameters, and/or circuitry to account for variables such as the type of cabling over which data is being communicated and the environmental conditions (e.g. temperature) surrounding the cabling. Once the link partners are "trained", they may initially transmit data at 10 Gbps, for example. In this regard, conventional PHY devices may distribute traffic evenly over all available physical channels and may continuously transmit IDLE symbols between packets of actual data. However, based upon patterns of offered data traffic, it may be determined that 10 Gbps may be higher than necessary or desired during one or more periods of time, for example. Accordingly, controlling the data rate of the connection between the link partners 102 and 104 may enable the link partners 102 and 104 to communicate in a more energy efficient manner. In this regard, lowering a data rate on the link 112 may reduce power consumed on the link 112 and in the link partners node 102 and node 104. The data rate may be controlled in one or more of a plurality of ways, for example, by controlling a number of physical channels utilized to communicate data, controlling the pulse amplitude modulation (PAM) levels used for signaling, controlling the signal constellation utilized for representing data on the link, and controlling the length of time between frames (the inter-frame gap).

In various embodiments of the invention, one or more policies and/or protocols may be implemented by the link partners 102 and 104 in order to improve energy efficiency. Accordingly, the link partners 102 and 104 may each comprise an energy efficient network (EEN) control entity which may comprise suitable logic, circuitry, and/or code for implementing the energy efficient networking policies and/or protocols. In order to implement these EEN protocols and/or policies, the link partners 102 and 104 may need to exchange control and/or management traffic. For example, control and/or management traffic may be utilized to communicate link state information, negotiate data rates on the link 112, indicate that a data rate change may be desired or necessary, and/or schedule one or more data rate transition. The data rate transition may be operable to enable energy efficient operation. Accordingly, aspects of the invention may enable utilizing a reserved and/or out-of-band channel, physical coding sub-layer (PCS) control characters and/or higher layer protocol packets for exchanging these control and/or management messages.

In various embodiments of the invention, one or more of the link nodes 102 and/or 104 may transmit and/or receive data traffic that may increase and/or decrease in a predictable and/or determined pattern. In such instances, the link partners 102 and/or 104 may increase and/or decrease data rates to accommodate the changing volumes of offered data traffic. For example, data, such as multimedia streams, may inherently have a cyclic and/or periodic pattern. Accordingly, various aspects of the invention may be enabled to duty cycle the data rate on the link 112 to match the pattern at which the multimedia traffic may be generated. In some instances, data arriving at the MAC from higher layers may not be inherently bursty, but may be shaped via buffering, such that it may be conveyed to the physical layer in a cyclic or periodic pattern. In such instances, a resulting pattern of traffic out of the buffers may be determined, for example, by latency requirements of the data.

In instances when the link partners node 102 and/or node 104 first start-up or upon establishing a connection, they may exchange some preliminary information via the PHY devices 110a and 110b and may train or adapt to current link conditions such that reliable communications may be established on the link. The training may comprise configuring various parameters, circuitry, and or timing loops in one or both of the nodes 102 and 104 such that the nodes may be synchronized and/or reliably communicate over one or more physical channels of the cable 112. The training may also be utilized to enable energy efficient operation. Moreover, the link partners node 102 and/or node 104 may negotiate a control or management policy wherein a pattern, over time, of changing data rates may be established based on synchronized timing. In this manner, the control or management policy and/or training activity may ensure reliable and/or energy efficient operation of functions such as echo cancellation, far-end crosstalk cancellation, and near-end crosstalk cancellation may be performed.

In various embodiments of the invention, a communication control or management policy may be determined based on how sensitive the data received from various sources is to latency. For example, data such as a multimedia stream may be relatively sensitive to latency while data, such as general web traffic, may be relatively insensitive to latency. The latency sensitive traffic may be communicated via a first duty cycling which may be communicated in more frequent but shorter bursts, for example. Duty cycles for the latency insensitive traffic may be interspersed between the latency sensitive duty cycles, for example, in longer but less frequent bursts. In this regard, the control and/or management policy may enable communication of traffic with varying latency tolerances over a common link.

Figure 2:
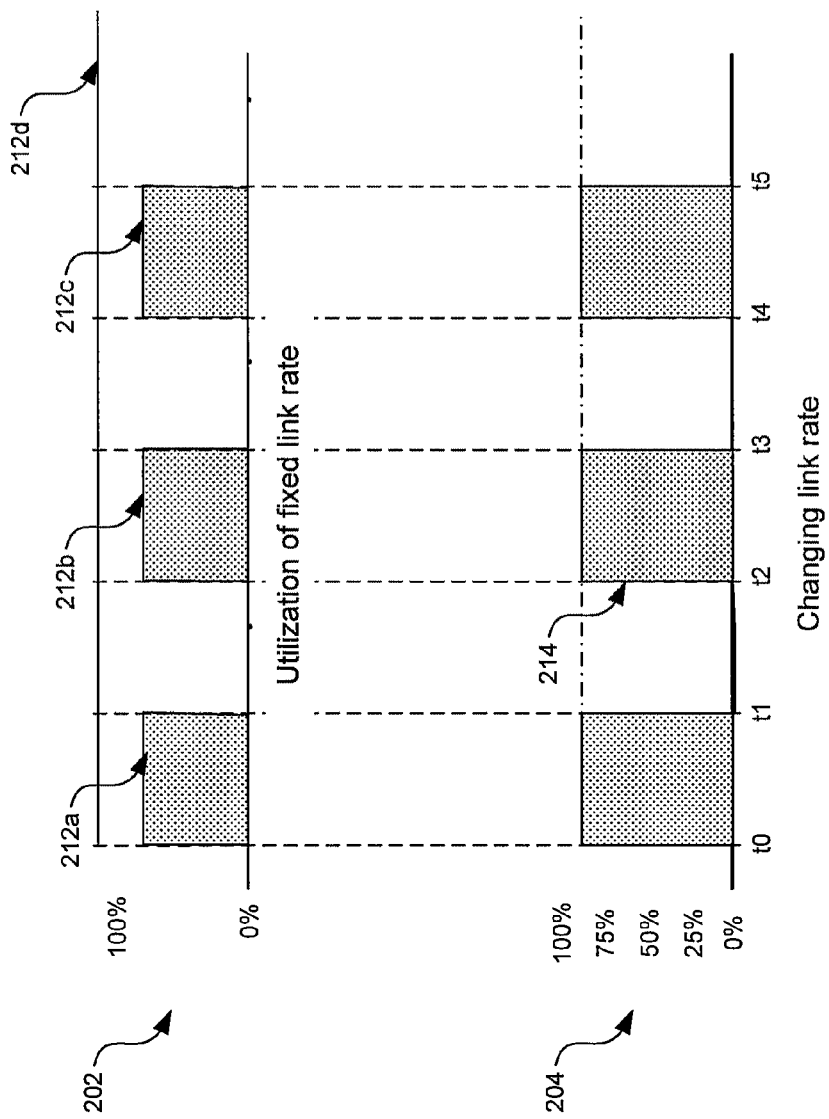
FIG. 2 is a timing diagram illustrating multiple exemplary link rate transitions enabled via a communication control policy, in accordance with an embodiment of the invention.

FIG. 2 is a timing diagram illustrating multiple exemplary link rate transitions enabled via a communication control policy, in accordance with an embodiment of the invention. Referring to FIG. 2 there is shown, a rate utilization over time chart 202 comprising a fixed link rate 212d and a changing rate utilized by offered data traffic represented by shaded areas 212a, 212b and 212c. A link rate over time chart 204 may comprise a changing link rate 214.

The link utilization over time chart 202 represents a link transmission rate 212d fixed at 100% relative to a percentage of the link rate 212d utilized by offered data traffic 212a, 212b and 212c. Fixing the link rate 212d at 100% may result in network links being underutilized wherein IDLE symbols may be transmitted during periods when offered data traffic is low(er) or zero. The fixed link rate 212d may be a standard rate such as 10 GBASET or a non standard rate for example. The link utilization from time instant t0 to t1, t2 to t3 and t4 to t5 may be at a percentage of the full link rate 212d. Furthermore, the link utilization for time periods t1 to t2 and t3 to t4 may be zero if data is buffered or not offered during those time periods.

Also shown in FIG. 2 is the changing link rate over time chart 204 that represents a changing link rate 214. The link rate 214 may change over time in accordance with the changes in offered data traffic 212a, 212b and/or 212c. In this regard, from time instants t0 to t1, t2 to t3 and t4 to t5, the link rate 214 may be based on the offered data rate 212a, 212b and/or 212c plus some head room for physical layer signaling, for example. From time instants t1 to t2 and t3 to t4 during periods of zero or buffered offered data, the link rate may be zero or very low. In this manner, savings in energy may be enabled relative to link utilization.

In operation, the link nodes 102 and/or 104 may determine a pattern over time of offered data traffic (or link utilization) 212a, 212b and/or 212c for data travelling in one or both directions on the link 112. The link nodes 102 and/or 104 may negotiate a pattern for changing link rates on the link 112 that may enable reliable communication of the pattern of offered data traffic 212a, 212b and/or 212c while saving energy.

Figure 3:
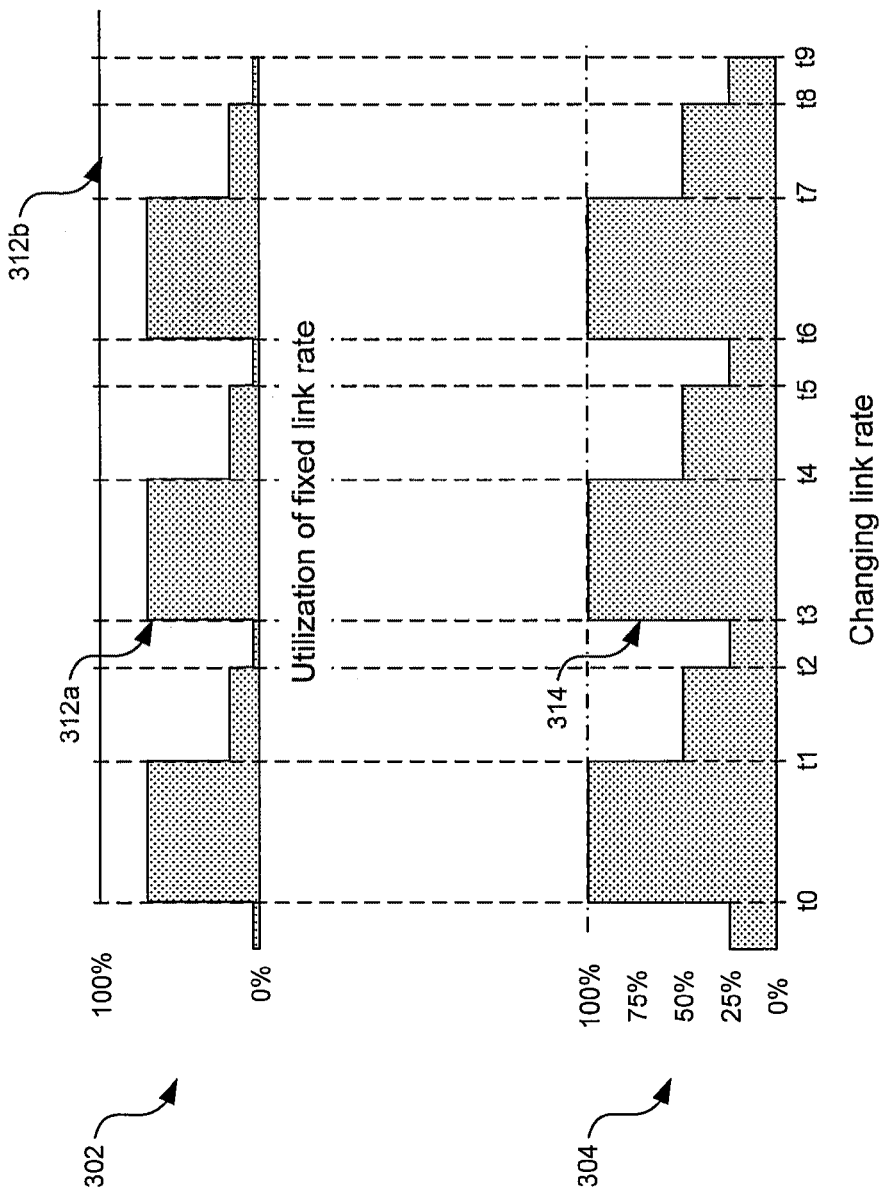
FIG. 3 is a timing diagram illustrating multiple exemplary link rate transitions enabled via a communication control policy, in accordance with an embodiment of the invention.

FIG. 3 is a timing diagram illustrating multiple exemplary link rate transitions enabled via a communication control policy, in accordance with an embodiment of the invention. Referring to FIG. 3, there is shown rate utilization over time chart 302 comprising a fixed link rate 312b and a changing rate utilized by offered data traffic represented by shaded area 312a. A link rate over time chart 304 may comprise a changing link rate 314.

The link utilization over time chart 302 represents a link transmission rate 312b fixed at 100% relative to a percentage of the link rate 312b utilized by offered data traffic 312a. Fixing the link rate 312b at 100% may result in network links being underutilized wherein IDLE symbols may be transmitted during periods when offered data traffic is less than the full link rate. The fixed link rate 312b may be a standard rate such as 10 GBASET or a non standard rate for example. The link utilization by offered data traffic 312a may be at a high percentage of the link rate 312 from time instant t0 to t1, may step down to a lower rate between time instants t1 to t2 and may step down to a very low rate between time instants t2 to t3. This stepping down pattern of utilization by data traffic 312a may be repeated between time instants t3 to t4, t4 to t5 and t5 to t6 and repeated again between time instants t6 to t7, t7 to t8 and t8 to t9.

Also shown in FIG. 3 is the changing link rate over time chart 304 that represents a changing link rate 314. The link rate 314 may change over time in accordance with the changes in offered data traffic 312a. In this regard, a pattern of stepping down wherein the link rate 314 may be high or full rate between time instants t0 to t1, may be a lower rate between time instants t1 to t2 and a very low rate between time instants t2 to t3 may be repeated between time instants t3 to t4, t4 to t5 and t5 to t6 and repeated again between time instants t6 to t7, t7 to t8 and t8 to t9. The link rate 314 may be based on the offered data rate plus some head room for physical layer signaling for example. In this manner, savings in energy may be enabled relative to link utilization.

In operation, the link nodes 102 and/or 104 may determine a pattern over time of offered data traffic (or link utilization) 312a for data travelling in one or both directions on the link 112. The link nodes 102 and/or 104 may negotiate a communication policy for controlling a pattern of changing link rates on the link 112 that may enable reliable communication of the pattern of offered data traffic 312a while saving energy relative to transmitting at a fixed link rate.

Figure 4:
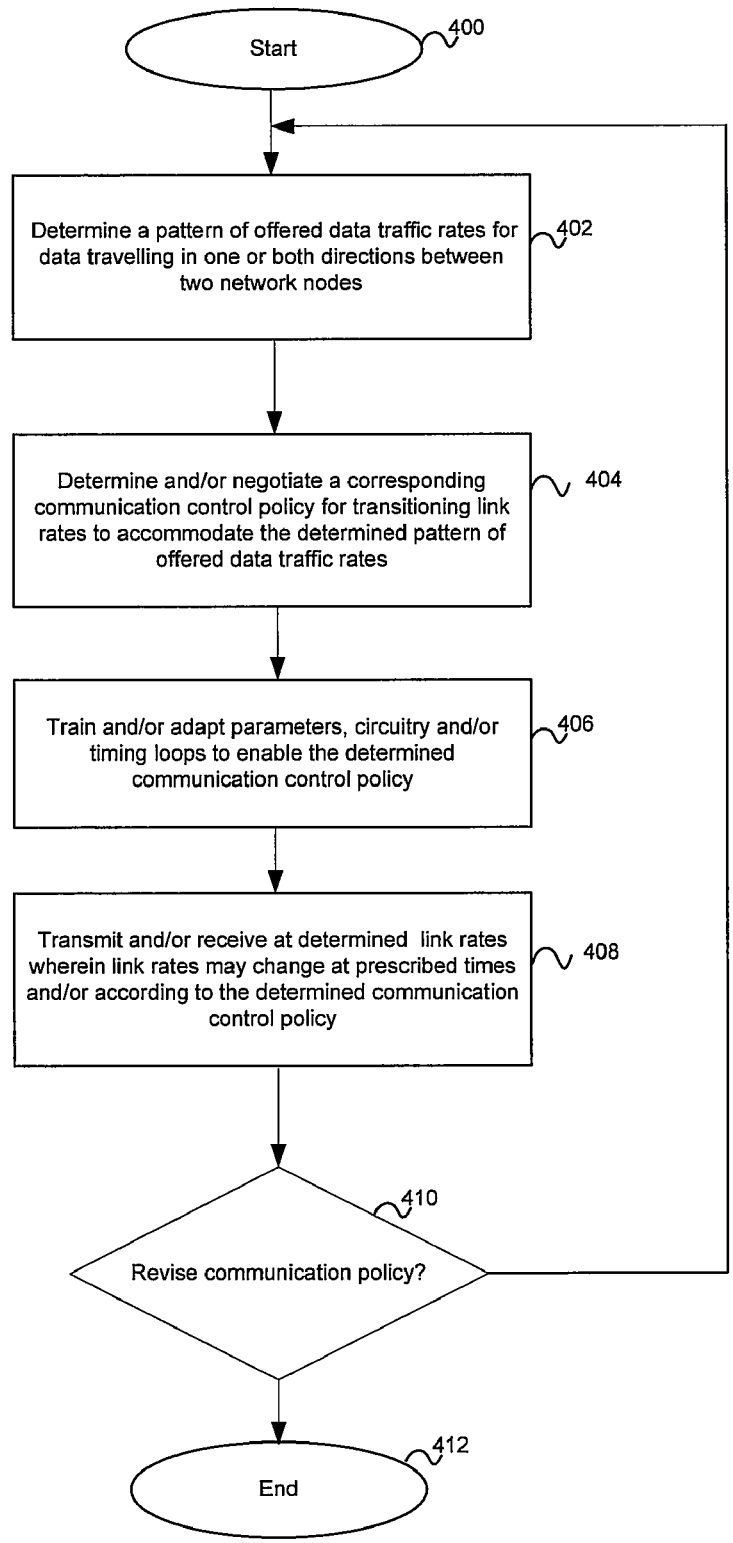
FIG. 4 is a flow chart illustrating exemplary steps for implementing multiple link rate transitions based on a communication control policy, in accordance with an embodiment of the invention.

FIG. 4 is a flow chart illustrating exemplary steps for implementing multiple link rate transitions based on a communication control policy, in accordance with an embodiment of the invention. Referring to FIG. 4, after start step 400, in step 402, a pattern of offered data traffic rates 312a may be determined for data travelling in one or both directions between two network nodes 102 and 104. In step 404, a corresponding communication control policy may be determined and/or negotiated for transitioning link rates to accommodate the determined pattern of offered data traffic rates 312a. In step 406, the nodes 102 and/or 104 may train and/or adapt parameters, circuitry and/or timing loops to enable the determined communication control policy. In step 408, the nodes 102 and/or 104 may transmit and/or receive at the determined link rates wherein link rates may change at prescribed times and/or according to the determined communication control policy. In step 410, when it is determined that the control policy may not be revised, proceed to step 412. Step 412 may be an end of exemplary steps. In step 410, when it is determined that the control policy may be revised, the exemplary steps may proceed to step 402.

In an embodiment of the invention, an Ethernet network may comprise multi-rate link partners, node 102 and node 104, that may be coupled via an Ethernet link 112. A pattern, over time, of rates for transmitting data 212a, 212b, 212c and/or 312a between node 102 and node 104 may be determined. In this regard, a communication policy may be established among the multi-rate link partners 102 and 104 to modify link transmission rates 214 and/or 314 over time. In this manner, the link transmission rates 214 and/or 314 may mimic the pattern, over time, of rates for transmitting data 212a, 212b, 212c and/or 312a. Moreover, data may be transmitted and/or received between node 102 and node 104 at the link transmission rates 214 and/or 314, modified over time according to the communication policy which may enable link partners 102 and/or 104 to reduce the number of steps taken to transition between different link rates. Accordingly, the communication control policy may be communicated between node 102 and node 104 via one or more of physical layer control characters, physical layer out of band channel and packets generated from protocols above the physical layer. In addition, link transmission rates between node 102 and node 104 may be symmetrical or asymmetrical with respect to direction of transmission. In various embodiments of the invention, link transmission rates may comprise the offered data rate, for example, 212a, 212b, 212c and/or 312a plus additional bandwidth for head room. The link transmission rates modified over time 214 and/or 314 may comprise one or more of a full rate, an intermediate rate and/or a rate of zero. Transitions between link rates may be synchronized among node 102 and node 104. In various embodiments of the invention, an established communication policy may be dynamically modified, for example, based on link utilization. In this manner, operation of Ethernet link partners 102 and 104 may be more energy efficient.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for negotiating multiple data rate transitions on an Ethernet link.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in an Ethernet network comprising multi-rate link partners coupled via an Ethernet link, performing by one of said coupled multi-rate link partners:
determining a repeated temporal pattern of data rates for transmission of data between said multi-rate link partners, said repeated temporal pattern being characterized by a plurality of time periods having an associated plurality of data rates, said plurality of time periods including a first time period having a first data rate and a second time period having a second data rate different from said first data rate;
establishing a communication control policy among said multi-rate link partners to modify link transmission rates periodically to match changes in said data rates as defined by said plurality of time periods in said determined repeated temporal pattern; and
transmitting and/or receiving said data between said multi-rate link partners coupled via said Ethernet link according to said established communication control policy, said transmitting and/or receiving data at said link transmission rates occurring symmetrically or asymmetrically with respect to a direction of said transmitting and/or receiving.

2. The method according to claim 1, wherein said link transmission rates comprise said rates for transmitting said data plus head room.

3. The method according to claim 1, comprising synchronizing said modifications of said link transmission rates among said multi-rate link partners coupled via said Ethernet link.

4. The method according to claim 1, wherein said link transmission rates modified over time comprise one or more of a full rate, an intermediate rate and a rate of zero.

5. The method according to claim 1, comprising negotiating said communication control policy via one or more of physical layer control characters, physical layer out of band channel and packets generated from protocols above a physical layer.

6. The method according to claim 1, comprising dynamically modifying said established communication control policy.

7. The method according to claim 1, comprising dynamically modifying said established communication control policy based on link utilization.

8. The method according to claim 1, comprising dynamically modifying said established communication control policy to ensure energy efficient operation of one or more of said multi-rate link partners.

9. The method according to claim 1, wherein said link transmission rates mimic said repeated temporal pattern of said rates for transmitting said data.

10. The method according to claim 1, comprising reducing steps for transitioning between different link rates based on said established communication control policy.

11. A non-transitory computer readable storage having stored thereon, a computer program having at least one code section for communication, the at least one code section being executable by a machine for causing the machine to perform steps comprising:
 in an Ethernet network comprising multi-rate link partners coupled via an Ethernet link, performing by one of said coupled multi-rate link partners:
  determining a repeated temporal pattern of data rates for transmission of data between said multi-rate link partners, said repeated temporal pattern being characterized by a plurality of time periods having an associated plurality of data rates, said plurality of time periods including a first time period having a first data rate and a second time period having a second data rate different from said first data rate;
  establishing a communication control policy among said multi-rate link partners to modify link transmission rates periodically to match changes in said data rates as defined by said plurality of time periods in said determined repeated temporal pattern; and
  transmitting and/or receiving said data between said multi-rate link partners coupled via said Ethernet link at said link transmission rates modified over time according to said communication control policy, said transmitting and/or receiving data between said multi-rate link partners at said link transmission rates occurring symmetrically and asymmetrically with respect to a direction of said transmitting and/or receiving.

12. The non-transitory computer readable storage according to claim 11, wherein said link transmission rates comprise said rates for transmitting said data plus head room.

13. The non-transitory computer readable storage according to claim 11, wherein said at least one code section comprises code for synchronizing said modifications of said link transmission rates among said multi-rate link partners coupled via said Ethernet link.

14. The non-transitory computer readable storage according to claim 11, wherein said link transmission rates modified over time comprise one or more of a full rate, an intermediate rate and a rate of zero.

15. The non-transitory computer readable storage according to claim 11, wherein said at least one code section comprises code for negotiating said communication control policy via one or more of physical layer control characters, physical layer out of band channel and packets generated from protocols above a physical layer.

16. The non-transitory computer readable storage according to claim 11, wherein said at least one code section comprises code for dynamically modifying said established communication control policy.

17. The non-transitory computer readable storage according to claim 11, wherein said at least one code section comprises code for dynamically modifying said established communication control policy based on link utilization.

18. The non-transitory computer readable storage according to claim 11, wherein said at least one code section comprises code for dynamically modifying said established communication control policy to ensure energy efficient operation of one or more of said multi-rate link partners.

19. The non-transitory computer readable storage according to claim 11, wherein said link transmission rates mimic said repeated temporal pattern of said rates for transmitting said data.

20. The non-transitory computer readable storage according to claim 11, wherein said at least one code section comprises code for reducing steps for transitioning between different link rates based on said established communication control policy.

21. A system for communication, the system comprising:
 one or more circuits for use in a multi-rate link partner of an Ethernet network comprising said multi-rate link partner and one or more other multi-rate link partners coupled via an Ethernet link, said one or more circuits being operable to:
  determine a repeated temporal pattern of data rates for transmission of data between said multi-rate link partners, said repeated temporal pattern being characterized by a plurality of time periods having an associated plurality of data rates, said plurality of time periods including a first time period having a first data rate and a second time period having a second data rate different from said first data rate;
  establish a communication control policy among said multi-rate link partners to modify link transmission rates periodically to match changes in said data rates as defined by said plurality of time periods in said determined repeated temporal pattern; and
  transmit and/or receive said data between said multi-rate link partners coupled via said Ethernet link according to said established communication control policy, said transmitting and/or receiving data at said link transmission rates occurring symmetrically or asymmetrically respect to a direction of said transmitting and/or receiving.

22. The system according to claim 21, wherein said link transmission rates comprise said rates for transmitting said data plus head room.

23. The system according to claim 21, wherein said one or more circuits enables synchronization of said modifications of said link transmission rates among said multi-rate link partners coupled via said Ethernet link.

24. The system according to claim 21, wherein said link transmission rates modified over time comprise one or more of a full rate, an intermediate rate and a rate of zero.

25. The system according to claim 21, wherein said one or more circuits enable negotiation of said communication control policy via one or more of physical layer control characters, physical layer out of band channel and packets generated from protocols above a physical layer.

26. The system according to claim 21, wherein said one or more circuits enable dynamic modification said established communication control policy.

27. The system according to claim 21, wherein said one or more circuits enable dynamic modification of said established communication control policy based on link utilization.

28. The system according to claim 21, wherein said one or more circuits enable dynamic modification said established communication control policy to ensure energy efficient operation of one or more of said multi-rate link partners.

29. The system according to claim 21, wherein said link transmission rates mimic said repeated temporal pattern of said rates for transmitting said data.

30. The system according to claim 21, wherein said one or more circuits enables reduction of steps for transitioning between different link rates based on said established communication control policy.

31. A method for communication, the method comprising:
in an Ethernet network comprising multi-rate link partners coupled via an Ethernet link, performing by a first of said multi-rate link partners:
determining a repeated temporal pattern of data rates for transmission of data to a second of said multi-rate link partners and/or for receiving data from said second of said multi-rate link partners, said repeated temporal pattern being characterized by a plurality of time periods having an associated plurality of data rates, said plurality of time periods including a first time period having a first data rate and a second time period having a second data rate different from said first data rate;
establishing a communication control policy among said multi-rate link partners to modify link transmission rates periodically to match changes in said data rates as defined by said plurality of time periods in said determined repeated temporal pattern; and
transmitting said data to said second of said multi-rate link partners and/or receiving data from said second of said multi-rate link partners via said Ethernet link, according to said established communication control policy, said transmitting and/or receiving data at said link transmission rates occurring symmetrically or asymmetrically with respect to a direction of said transmitting and/or receiving.

32. The method according to claim 31, wherein said link transmission rates comprise rates for transmitting said data to said second of said multi-rate link partners plus head room or said rates for receiving said data from said second of said multi-rate link partners plus head room.

33. The method according to claim 31, comprising synchronizing said modifications of said link transmission rates among said multi-rate link partners coupled via said Ethernet link.

34. The method according to claim 31, wherein said link transmission rates modified over time comprise one or more of a full rate, an intermediate rate and a rate of zero.

35. The method according to claim 31, comprising negotiating said communication control policy via one or more of physical layer control characters, physical layer out of band channel and packets generated from protocols above a physical layer.

36. The method according to claim 31, comprising dynamically modifying said established communication control policy.

37. The method according to claim 31, comprising dynamically modifying said established communication control policy based on link utilization.

38. The method according to claim 31, comprising dynamically modifying said established communication control policy to ensure energy efficient operation of one or more of said multi-rate link partners.

39. The method according to claim 31, wherein said link transmission rates mimic said repeated temporal pattern of said rates for transmitting said data and/or for receiving said data.

40. The method according to claim 31, comprising reducing steps for transitioning between different link rates based on said established communication control policy.

41. A non-transitory computer readable storage having stored thereon, a computer program having at least one code section for communication, the at least one code section being executable by a machine for causing the machine to perform steps comprising:
in an Ethernet network comprising multi-rate link partners coupled via an Ethernet link, performing by a first of said multi-rate link partners:
determining a repeated temporal pattern of data rates for transmission of data to a second of said multi-rate link partners and/or for receiving data from said second of said multi-rate link partners, said repeated temporal pattern being characterized by a plurality of time periods having an associated plurality of data rates, said plurality of time periods including a first time period having a first data rate and a second time period having a second data rate different from said first data rate;
establishing a communication control policy among said multi-rate link partners to modify link transmission rates periodically to match changes in said data rates as defined by said plurality of time periods in said determined repeated temporal pattern; and
transmitting said data to said second of said multi-rate link partners and/or receiving data from said second of said multi-rate link partners via said Ethernet link, according to said established communication control policy, said transmitting and/or receiving data at said link transmission rates occurring symmetrically or asymmetrically with respect to a direction of said transmitting and/or receiving.

42. The non-transitory computer readable storage according to claim 41, wherein said link transmission rates comprise rates for transmitting said data to said second of said multi-rate link partners plus head room or said rates for receiving said data from said second of said multi-rate link partners plus headroom.

43. The non-transitory computer readable storage according to claim 41, comprising synchronizing said modifications of said link transmission rates among said multi-rate link partners coupled via said Ethernet link.

44. The non-transitory computer readable storage according to claim 41, wherein said link transmission rates modified over time comprise one or more of a full rate, an intermediate rate and a rate of zero.

45. The non-transitory computer readable storage according to claim 41, comprising negotiating said communication control policy via one or more of physical layer control characters, physical layer out of band channel and packets generated from protocols above a physical layer.

46. The non-transitory computer readable storage according to claim 41, comprising dynamically modifying said established communication control policy.

47. The non-transitory computer readable storage according to claim 41, comprising dynamically modifying said established communication control policy based on link utilization.

48. The non-transitory computer readable storage according to claim 41, comprising dynamically modifying said established communication control policy to ensure energy efficient operation of one or more of said multi-rate link partners.

49. The non-transitory computer readable storage according to claim 41, wherein said link transmission rates mimic said repeated temporal pattern of said rates for transmitting said data and/or for receiving said data.

50. The non-transitory computer readable storage according to claim 41, comprising reducing steps for transitioning between different link rates based on said established communication control policy.

51. A system for communication, the system comprising:
one or more circuits for use in a first of a plurality of multi-rate link partners coupled via an Ethernet link in an Ethernet network, said one or more circuits are operable to:
determine a repeated temporal pattern of data rates for transmission of data to a second of said plurality of multi-rate link partners and/or for receiving data from said second of said plurality of multi-rate link partners, said repeated temporal pattern being characterized by a plurality of time periods having an associated plurality of data rates, said plurality of time periods including a first time period having a first data rate and a second time period having a second data rate different from said first data rate;
establish a communication control policy among said plurality of multi-rate link partners to modify link transmission rates periodically to match changes in said data rates as defined by said plurality of time periods in said determined repeated temporal pattern; and
transmit said data to said second of said plurality of multi-rate link partners and/or receive data from said second of said plurality of multi-rate link partners via said Ethernet link, according to said established communication control policy, said transmitting and/or receiving data at said link transmission rates occurring symmetrically or asymmetrically with respect to a direction of said transmitting and/or receiving.

52. The system according to claim 51, wherein said link transmission rates comprise rates for transmitting said data to said second of said plurality of multi-rate link partners plus head room or said rates for receiving said data from said second of said plurality of multi-rate link partners plus headroom.

53. The system according to claim 51, wherein said one or more circuits are operable to synchronize said modifications of said link transmission rates among said plurality of multi-rate link partners coupled via said Ethernet link.

54. The system according to claim 51, wherein said link transmission rates modified over time comprise one or more of a full rate, an intermediate rate and a rate of zero.

55. The system according to claim 51, wherein said one or more circuits are operable to negotiate said communication control policy via one or more of physical layer control characters, physical layer out of band channel and packets generated from protocols above a physical layer.

56. The system according to claim 51, wherein said one or more circuits are operable to dynamically modify said established communication control policy.

57. The system according to claim 51, wherein said one or more circuits are operable to dynamically modify said established communication control policy based on link utilization.

58. The system according to claim 51, wherein said one or more circuits are operable to dynamically modify said established communication control policy to ensure energy efficient operation of one or more of said plurality of multi-rate link partners.

59. The system according to claim 51, wherein said link transmission rates mimic said repeated temporal pattern of said rates for transmitting said data and/or for receiving said data.

60. The system according to claim 51, wherein said one or more circuits are operable to reduce steps for transitioning between different link rates based on said established communication control policy.

* * * * *

UNITED STATES PATENT AND TRADEMARK OFFICE
CERTIFICATE OF CORRECTION

PATENT NO. : 8,395,992 B2
APPLICATION NO. : 12/235391
DATED : March 12, 2013
INVENTOR(S) : Wael William Diab It is certified that error appears in the above-identified patent and that said Letters Patent is hereby corrected as shown below:

In the Claims:

Col. 11, line 53, replace "and" with --or--.

Col. 12, line 53, before "respect", insert --with--.

Signed and Sealed this
Seventh Day of May, 2013

Teresa Stanek Rea
*Acting Director of the United States Patent and Trademark Office*